Feb. 16, 1937. H. L. ADAMS 2,071,012
NOISELESS DEVICE
Filed Nov. 22, 1932 2 Sheets-Sheet 1

Inventor
H. L. Adams

Feb. 16, 1937.  H. L. ADAMS  2,071,012
NOISELESS DEVICE
Filed Nov. 22, 1932   2 Sheets-Sheet 2
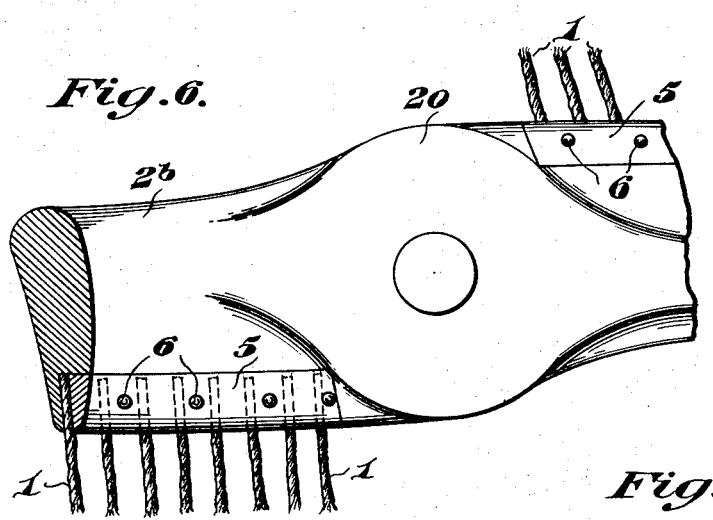
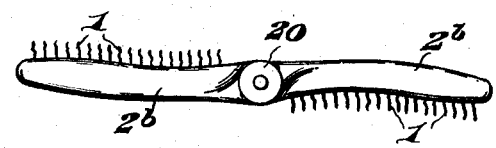
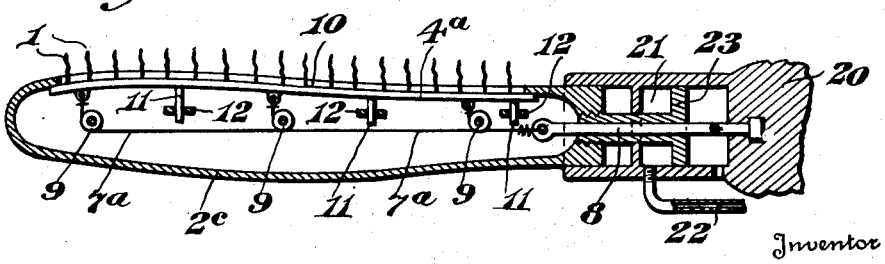
Inventor
H. L. Adams Patented Feb. 16, 1937

2,071,012

UNITED STATES PATENT OFFICE 2,071,012

NOISELESS DEVICE

Herbert Luther Adams, Washington, D. C.

Application November 22, 1932, Serial No. 644,556

6 Claims. (Cl. 244—1)

This case is a continuation in part of my original application Serial Number 461,412, filed April 14, 1921, and since matured into Patent Number 1,888,418.

My invention primarily relates to that class of flying machines which are heavier than air but certain details may be used on any flying machine, aircraft, or other uses.

The object of my invention is to provide a flexible material at the rear edge of fast moving objects or fast moving parts to reduce the noise caused by the inrush of air after the object or parts has moved on.

A further object is to provide flexible parts attached to moving or vibrating parts which produce noise to decrease or eliminate the noise.

A still further object is to provide a noiseless device that may be brought into operation or removed from operation when the need or lack of it exists as when an aeroplane may be making a surprise attack upon an enemy, or when near thickly settled communities where noise is objectionable, at other times for efficiency it may be removed.

A still further object is to provide flexible material at any place to decrease noise substantially as shown or disclosed.

A still further object is to provide means in an aircraft similar to those employed by some of the most noiseless flight birds, especially the owl that has soft, downy feathers in connection with its wings. The owl being an ornithopter requires this device in different location than a gliding motion would require. Nevertheless, the owl in its plunge after its prey glides to some extent.

A still further object is to provide a device to reproduce in mechanical form the wings of an owl which is known to be a bird whose flight is swift and most noiseless having soft downy feathers in connection with the under side thereof. This is entirely apart from regular bird feathers common to most birds.

A still further object is to provide a device of the kind described, which, while primarily intended for aircrafts, may be adapted for use in connection with any vehicle or device.

Also there are certain other advantages which will hereinafter appear.

To these ends my invention consists in certain novel features which I will now proceed to describe and will then particularly point out in the claims.

In the accompanying drawings Figure 1 is a fragmentary plan of noiseless device.

Figure 6 shows a detail of the hub of a propeller with a preferred method of clamping the lines in the propeller to reduce the noise.

Figure 7 is a more complete view of propeller with noise reducing lines shown attached to the trailing edge of the propeller.

Figure 8 is a cross section through a propeller blade and hub showing an automatic means or a means for operating the silencing device of the propeller while in flight.

Figure 1:
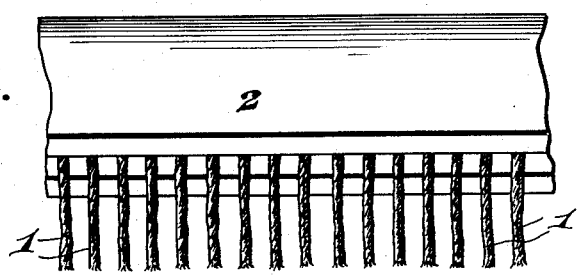
Figure 2:
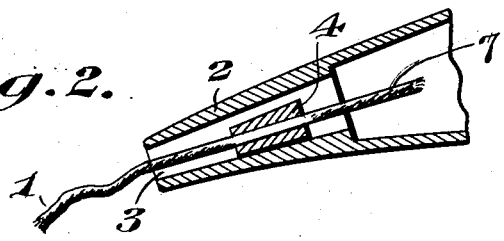
Figure 2 is a cross section through Figure 1 showing the noiseless device attached to means for withdrawing or extending said noiseless device from or to operation.
Figure 3:
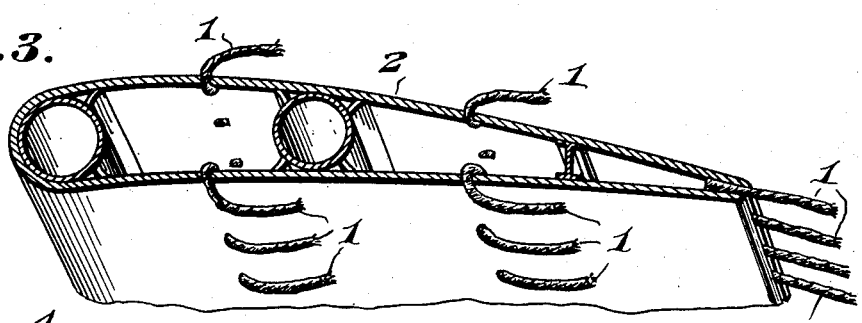
Figure 3 is a perspective cross section of an aerofoil for an aeroplane wing showing the attachment of flexible material to make silent flight by breaking up the eddies or vibration of air that cause sound.
Figure 4:
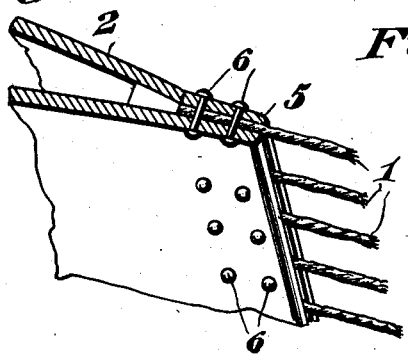
Figure 4 is a perspective detail of a means for securing flexible material in an aerofoil.
Figure 5:
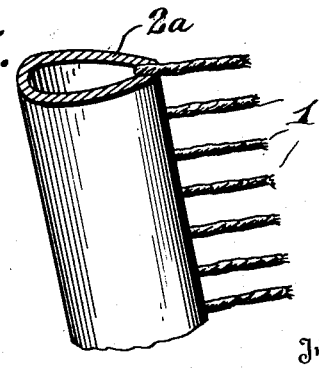
Figure 5 shows a perspective sectional view of a hollow strut or brace or framing with flexible material attached for reducing noise of flight or vibration.

In illustrating this device more specifically, I show noise reducing elements in the form of fibres 1 which may be attached to and extended from any element 2 which constitutes an airfoil. The fibres 1 are preferably of elongated form, and of limber construction in order that the outermost portions thereof may extend within the airstream of the airfoil in a somewhat parallel relation to the part of the airstream in which they move. The fibres may be secured to a movable header 4 within a slide joint 3, having means for controlling, extending or removing fibre or they may be immovably secured in place, such as by means of a cleat 5 and bolts 6. In addition to providing the fibres at the trailing edge of the airfoil or part with which they are used, the fibres also may be provided at various points along the surface of the airfoil as shown in Figure 3. Preferably the fibres 1 will be in the form of lengths of rope of relatively soft or fluffy material, and may be secured at their inner ends as shown in Figures 3 to 5, or may be extended inwardly beyond their points of connection as shown at 7 in Figure 2 in order that such extensions may be utilized for drawing in or letting out any movable part such as the header 4 to which the fibres may be connected. The extensions 7 may be secured in any suitable manner within reach of the aviator.

Specific means for adjusting the exposed lengths of the fibres 1 are shown in Figure 8, wherein the airfoil 2c represents a hollow propeller slidably mounted with respect to a hub 20. The hub 20 is formed with a compressed fluid chamber 21 having a compressed fluid supply pipe 22 discharging thereinto. A piston 23 is slidable within the chamber 21, and is connected with the inner end of the airfoil or propeller blade 2c in order that the latter may be retracted by the application of pressure within the chamber 21, or may be permitted to extend by the action of centrifugal force upon lowering or discontinuing such pressure.

In order that the fibres 1 may be automatically controlled by the extension and retraction of the blade 2c, the header 4a to which the fibres are secured is connected by means of a plurality of cables 7a with a rod 8 anchored in the hub 20 and extending into the interior of the hollow blade 2c. The lines 7a pass over pulleys 9 which change the direction of the lines and operate to draw the header 4a inwardly upon the extension of the blade 2c. The header 4a is disposed adjacent a suitable opening 10 in the blade 2c, and is maintained in proper relation therewith to have the fibres 1 extend therethrough by means of projections 11 on the header 4a which slidably extend through guides 12 immovably secured within the blade 2c. If desired, the lines 7a may be extended to any suitable manually controlled operating mechanism located at any convenient place within reach of the aviator. Any movement of the header 4a toward or from the opening 10 will lengthen or shorten the projecting portions of the fibres 1.

I have shown an apparatus embodying my invention in several general forms but do not wish to be understood as limiting myself strictly to the precise details of construction herein before described. I do not wish to be held to exact shapes or dimensions or to any particular combination of parts but wish to be free to use any part herein or described or covered by the class with any other parts or part whether shown herein or elsewhere.

Having thus described my invention, what I claim as new, and desire to secure by Letters Patent is:—

1. In a flying machine, an air contacting part, noise reducing means secured to said part, said noise reducing means comprising flapping members in connection with said part, and means to extend and withdraw said flapping members.

2. In a flying machine, an airfoil, noise reducing means secured to said airfoil, said noise reducing means comprising fibrous material in elongated form, one end of which is secured to said airfoil, and automatic means to adjust the exposed length of said fibrous material.

3. In a flying machine, an airfoil, noise reducing means secured to said airfoil, said noise reducing means comprising fluffy material in elongated form, one end of which is secured to said airfoil, and means to adjust the exposed length of said fluffy material into operative and inoperative position.

4. In a flying machine, an airfoil, noise reducing means secured to said airfoil, said noise reducing means comprising fibrous material in elongated form, one end of which is secured to said airfoil, and means to adjust the exposed length of said fibrous material.

5. In a flying machine, an airfoil, noise reducing means secured to said airfoil, said noise reducing means comprising fibrous material in elongated form secured to said airfoil and having loose ends projecting therefrom, and means for adjusting the exposed lengths of said loose ends.

6. In a flying machine, an airfoil, noise reducing means projecting from the rear edge of said airfoil and extending rearwardly therefrom in a general direction of the airstream, and means for increasing and decreasing the distance of rearward extension of said noise reducing means.

HERBERT L. ADAMS.